INVENTOR
William F. Plume

BY Strauch, Nolan & Neale

ATTORNEYS

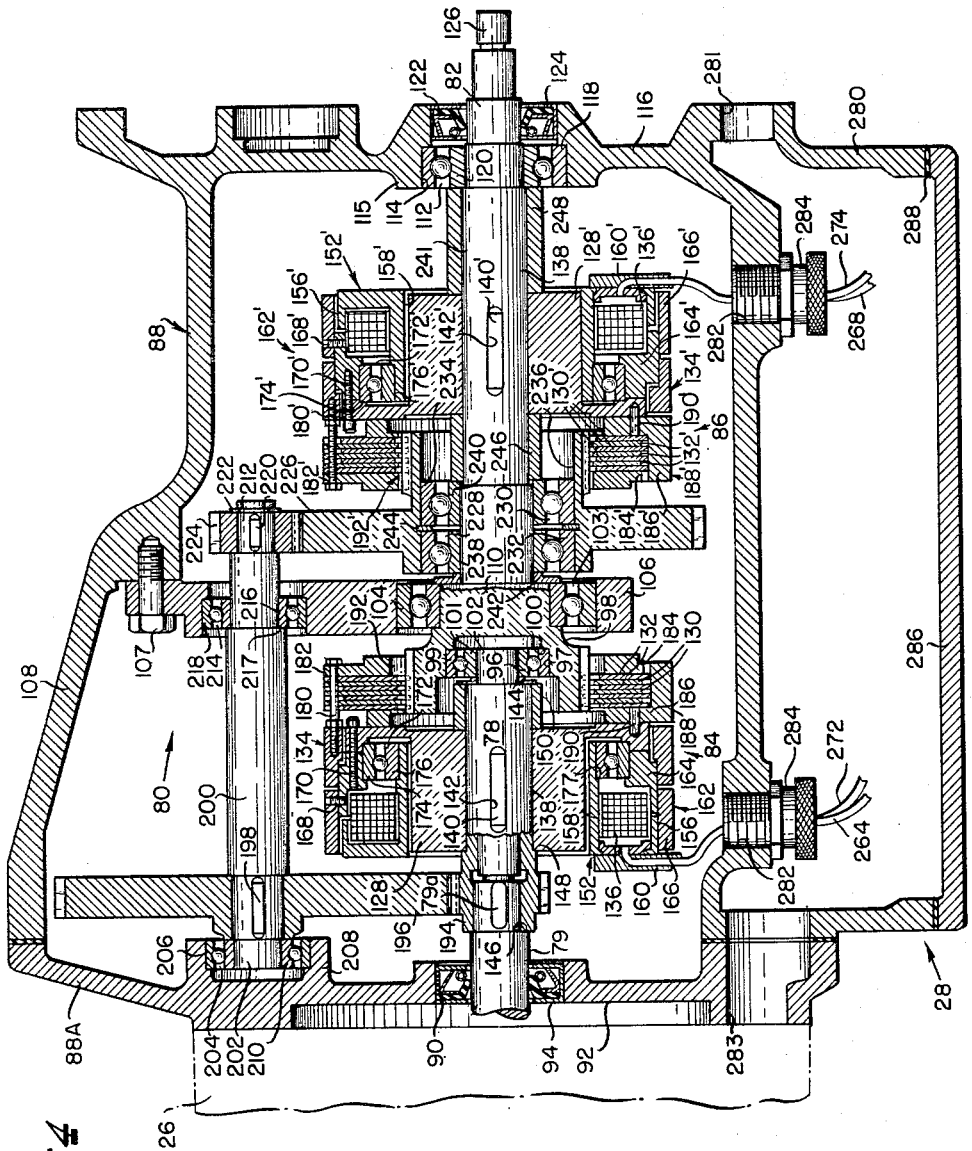

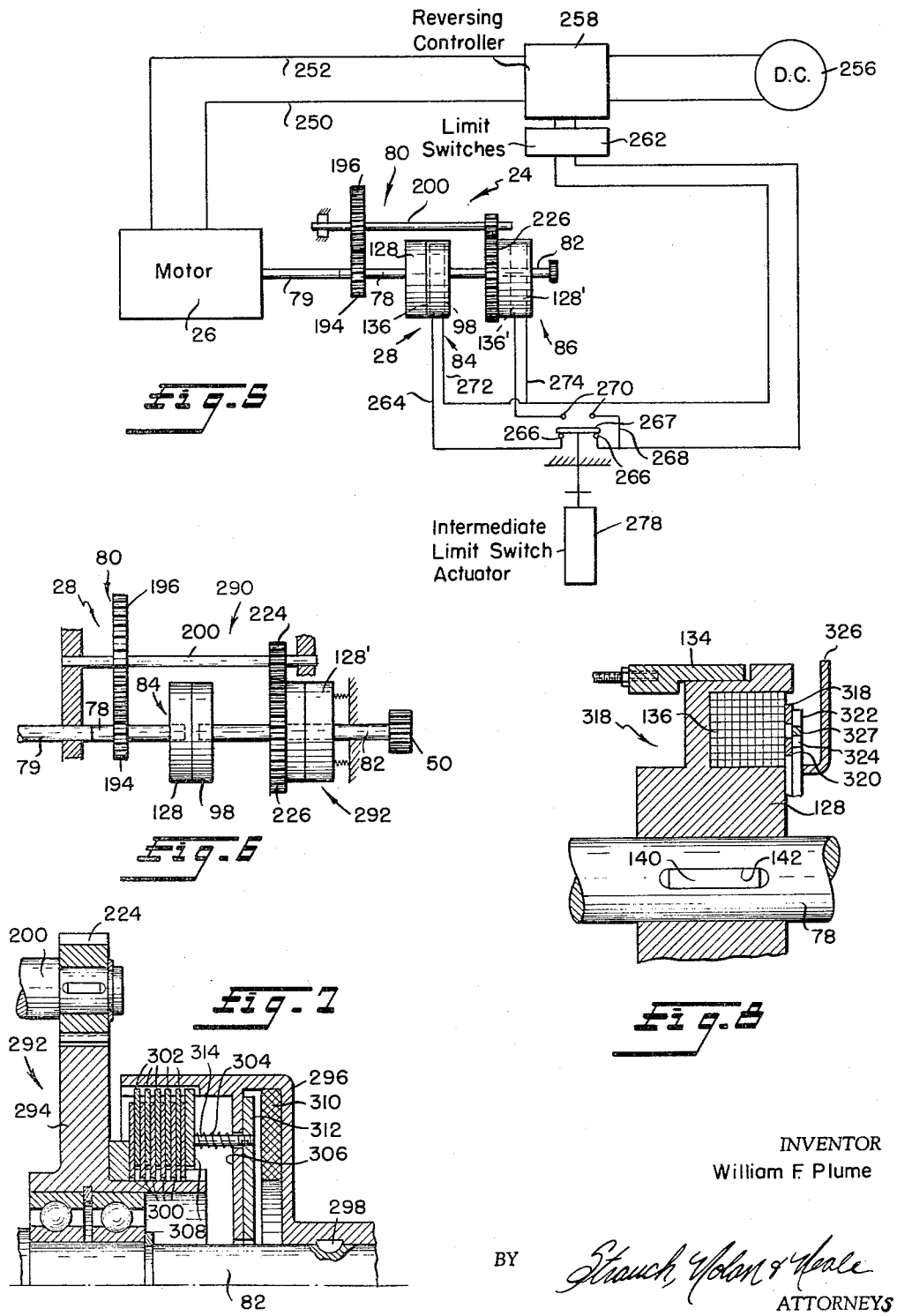

United States Patent Office 3,176,531
Patented Apr. 6, 1965

3,176,531
VALVE OPERATING APPARATUS
William F. Plume, Wheaton, Ill., assignor, by mesne assignments, to Link-Belt Company, a corporation of Illinois
Filed Jan. 8, 1962, Ser. No. 164,821
2 Claims. (Cl. 74—365)

This invention relates to valve operating apparatus and, more particularly, to a unitary two-speed drive assembly for connection between the motor and operating mechanism of existing power-operated valve assemblies.

The two-speed drive mechanism provided by the present invention is particularly useful in conjunction with the large power-operated gate valves commonly employed to control flow in pipelines and the like, although it may be used with other types of valves, if desired. A problem of particular importance relating to the use of large gate valves arises from the fact that, when such a valve is closed at a rapid rate, a surge in pressure will develop at the upstream side of the gate, producing an effect similar to a hammer blow. At conventional valve-closing speeds this hammer blow effect may be sufficiently violent to damage the valve or the pipe in which it is employed.

Accordingly, it has heretofore been proposed to incorporate in these large valves a two-speed drive assembly so that the valve member can be moved through the major portion of its travel from open to closed positions at a relatively high rate of speed and through the terminal portion of this closing movement at a much slower speed, thereby minimizing the pipeline pressure surge and reducing the hammer blow effect to an acceptable minimum. Typical of the prior art devices is that shown in United States Patent No. 2,912,087 issued to H. O. Kron et al. on November 10, 1959.

The primary object of the present invention is to provide improved two-speed drive assemblies for reducing hammer blow effect in large gate valves and the like.

Other objects of the present invention include:

(1) The provision of two-speed drive assemblies for large gate valves and the like which are less complex and, consequently, more inexpensive than those of the prior art;

(2) The provision of two-speed drive assemblies for gate valves and the like in which, at the higher drive speed, the drive assembly input is directly connected to a power source output with a resulting increase in efficiency;

(3) The provision of two-speed drive assemblies for large gate valves and the like having two independently operated clutching mechanisms for the low and high speed drives; and, (4) The provision of two-speed drive assemblies for large gate valves and the like which can be readily installed in existant valve assemblies.

In the present invention, these objects are accomplished by a novel arrangement of input and output power transmitting shafts, a novel speed reducing gear train, and a pair of independently actuable electromagnetic clutches for coupling the input and output shafts—directly for high speed operation and through the speed reducing gear train for low speed operation. All of the foregoing mechanism is mounted in a single housing, providing a unitary assembly which may be bolted or otherwise connected to the valve operator housing. The output shaft extends through the drive assembly housing and mounts, on its outer end, a gear which, when installed on a valve operator, will mesh with the input gear of the valve operator. The opposite end of the drive assembly housing is arranged so that an electric motor or other valve-operating power source may be bolted or otherwise fastened to it with the output of the power source engaged with the input of the drive assembly.

Further novel features and other objects of the invention will become apparent from the following detailed description, discussion, and the appended claims taken in conjunction with the accompanying drawings showing a preferred structure and embodiment in which:

FIGURE 4 is a sectional view, taken along line 4—4 of FIGURE 3, illustrating the details of the two-speed drive assembly;

FIGURE 5 is a circuit diagram of an exemplary control for the valve motor and the two-speed drive assembly;

FIGURE 6 is a schematic illustration of an alternative embodiment of a two-speed drive assembly constructed in accordance with the principles of the present invention;

FIGURE 7 is a generally schematic view, to an enlarged scale and in section, of a clutch employed in the embodiment of FIGURE 6; and, FIGURE 8 is a sectional fragmentary view of yet another electromagnetic clutch which may be employed in a two-speed drive assembly constructed in accordance with the principles of the present invention.

Figure 1:
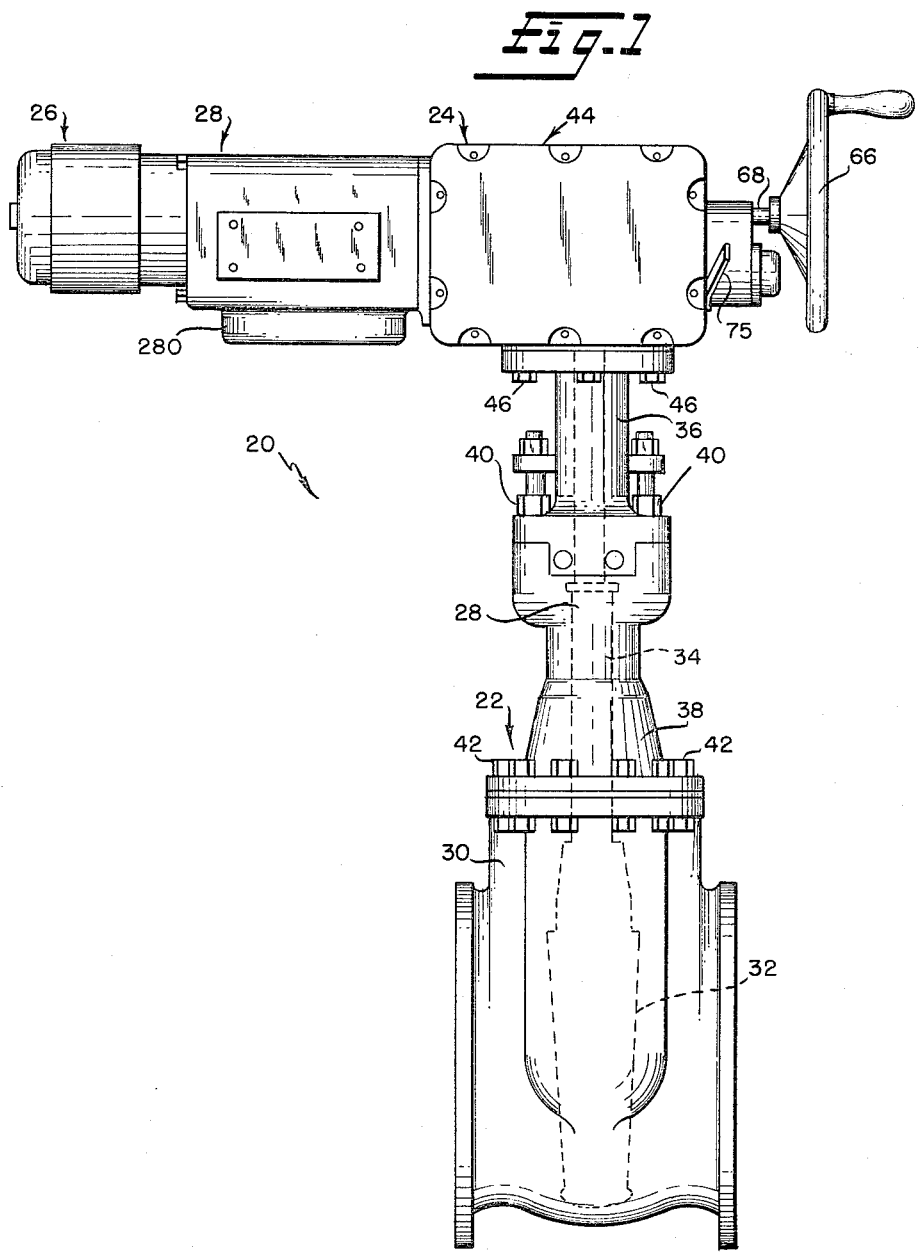
FIGURE 1 is a side elevation of a representative power-operated, reciprocating stem, gate valve assembly equipped with a two-speed drive assembly constructed in accordance with the principles of the present invention.

Referring now to the drawings, wherein exemplary structures are illustrated, FIGURE 1 shows a valve assembly 20 consisting of a reciprocating gate valve 22, a valve operator 24, an electric motor 26, and a two-speed drive assembly 28 constructed in accordance with the principles of the present invention and operatively interposed between the motor and valve operator. The illustrated valve 22 comprises a valve body 30 housing a flowing-controlling disc 32, a valve stem 34 connected to the disc and extending upwardly into valve operator 24, and a support for the valve operator including an upper yoke assembly 36 and a lower yoke assembly 38 secured to the upper yoke assembly by bolts 40 and to valve body 30 by bolts 42.

Valve operator 24 (see FIGURE 2) is mounted in a housing 44 which is secured to the top of upper yoke assembly 36 by bolts 46. The valve operator includes, generally, an input gear 48 intermeshed with output pinion 50 of the two-speed drive assembly 28, and connected through a selectively actuable clutch 52 to a clutch shaft 54. Rotatively fixed to clutch shaft 54 is a worm 56 which engages a worm wheel 58 rotatively fixed to a sleeve-like drive nut 60, shown in section in FIGURE 2. Drive nut 60, which is prevented from moving vertically by suitable bearings (not shown) in which it is free to rotate, is provided with internal helical threads 62 which engage mating external threads 64 on valve stem 34. Thus, as drive nut 60 is rotated by electric motor 26, acting through the above-described power train in valve operator 24 and a power train in two-speed drive assembly 28, which will be described presently, valve stem 34 is caused to move upwardly or downwardly (depending on the direction in which drive nut 60 is rotated) moving disc 32 to the open and closed positions, respectively. Valve operator 24 may be provided with position limit and torque limit switches (not shown)

which interrupt the supply of current to motor 26 when disc 32 reaches these open and closed positions.

Valve operator 24 also includes a hand wheel 66 rotatively fixed to one end of a shaft 68 on the other end of which is mounted a gear 70 engaged with a clutch element 72 rotatably journalled on clutch shaft 54. One element 74 of clutch 52 is rotatively fixed to clutch shaft 54 but is axially slidable thereon. Clutch element 74 may, by means of a clutch shift lever 75 acting through an appropriate linkage (not shown), be disengaged from the cooperating clutch element 76 operatively connected to input gear 48, and moved axially on clutch shaft 54 into driving engagement with clutch element 72. This effectively disconnects the valve operator from motor 26 and drive-connects hand wheel 66 to the drive nut 60 for manually opening and closing valve disc 32 in the event of power failure or other circumstances where manual control is deemed desirable.

The details of the above-described valve operator form no part of the present invention and are the subject matter of a separate application No. 146,648 filed October 20, 1961, to which reference may be had if deemed necessary.

Two-speed drive assembly

Figure 2:
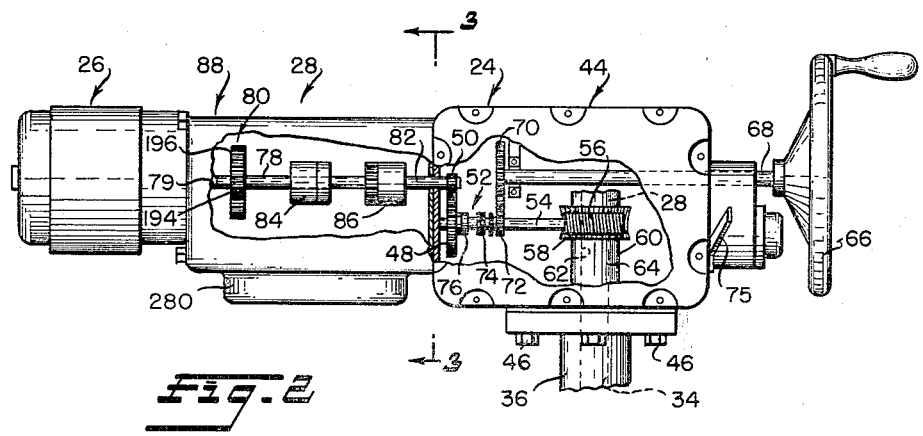
FIGURE 2 is a portion of the view of FIGURE 1 with certain housings broken away to show, in a general manner, the power train interposed between the valve-operating motor and the valve stem.
Figure 3:
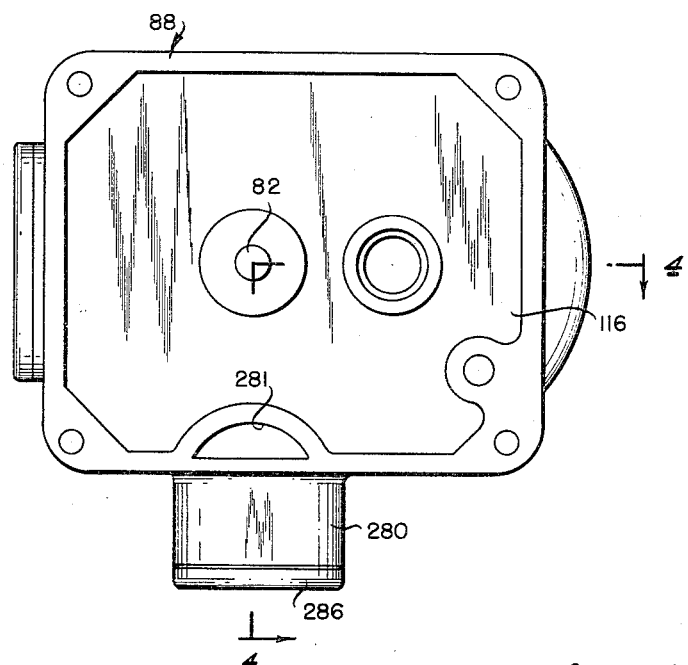
FIGURE 3 is an end view of the two-speed drive assembly housing and is taken substantially along line 3—3 of FIGURE 2.

As was discussed above, two-speed drive assembly 28 is interposed between constant speed valve motor 26 and valve operator 24 (which has a fixed-ratio power train) to decrease the speed at which the terminal portion of the closing movement of valve disc 32 is executed to eliminate problems such as water hammer. Referring now to FIGURE 2, the drive assembly consists generally of an input shaft 78 directly connected to the shaft 79 of motor 26, a speed reduction gear train 80 (see also FIGURE 4), and an independent output shaft 82 to which is rotatively fixed the drive assembly output gear 50 meshed with input gear 48 of valve actuator 24. Independently actuable electromagnetic clutches 84 and 86 are provided for drive-connecting input shaft 78 to output shaft 82 directly, and indirectly through speed reduction gear train 80, respectively. The foregoing mechanism is mounted in a housing 88 which is attached to valve operator housing 44 by bolts or other suitable releasable fasteners (not shown). Motor 26 is attached in a similar manner to the opposite end of two-speed drive assembly housing 88. Access is gained to the interior of housing 88 by removing cover 89 (see FIGURE 3), and motor adapter 88A (see FIGURE 4).

Referring now to FIGURE 4, the shaft 79 of motor 26 extends through an aperture 90 in the side wall 92 of motor adapter 88A and is connected to input shaft 78 by a key 79A or similar fastener. An oil seal 94, disposed in aperture 90, surrounds motor shaft 79 and prevents lubricant from leaking to the exterior of the housing.

At its left-hand end, then, input shaft 78 will derive some support from motor shaft 79. The right-hand end of input shaft 78 is journalled in a ball bearing 96 mounted in a horizontally extending annular recess 97 in a cup-shaped end ball 98 which is rotatively fixed to the left-hand end of output shaft 82 and which constitutes the output element of electromagnetic clutch 84. The outer race 99 of ball bearing 96 abuts an inwardly extending internal annular shoulder 100 in end bell 98 and its inner race 101 surrounds the right-hand reduced diameter end portion 102 of the input shaft.

End bell 98 is journalled in a ball bearing 103, the ouster race 104 of which is mounted in a support bracket 106 attached by bolts 107 (only one of which is shown) to the side wall 108 of housing 88. The reduced diameter, right-hand end portion 110 of end bell 98 is rigidly fixed to or is integral with the left-hand end of output shaft 82 which is supported at its left-hand end by the clutch body and at its right-hand end by a ball bearing 112 mounted in a horizontally extending annular recess 114 in an embossment 115 formed on the right-hand end wall 116 of housing 88. The outer race 118 of ball bearing 112 engages the wall surfaces of the recess and its inner race 120 surrounds the ouput shaft. Output shaft 82 extends beyond bearing 112 through an aperture 122 in hoursing end wall 116 which is closed by an oil seal 124 disposed in the aperture in surrounding relationship to the output shaft. Shaft 82 terminates in a threaded, reduced diameter end portion 126 on which pinion 50, described above, is rotatively fixed. It will be apparent, from the foregoing description, that input shaft 78 and ouput shaft 82 may rotate independently of each other inasmuch as they are connected only by ball bearing 96 which maintains their axial alignment while permitting relative rotation.

Electromagnetic clutch 84, referred to above, is preferably a Fawick Magnetic Clutch and consists generally of an input element 128; the end bell 98, described generally above, which is the ouput element of the clutch; a first series of clutch plates 130 rotatively fixed to end bell 98; a second series of clutch plates 132 alternated with clutch plates 130 and fixed to an armature assembly 134 which is rotatively fixed to, but axially displaceable along, clutch input element 128; and a stationary coil 136 selectively energizable to displace armature assembly 134, frictionally engaging clutch plates 130 and 132, and thereby drive-connecting clutch input element 128 to end bell 98.

The input element 128 of clutch 84 is rotatively fixed to input shaft 78 by a key 140. The proper axial relation between input shaft 78 and input element 128 is maintained, at the right-hand end of the sleeve, by a thrust washer 144 which extends between the end of the sleeve and the inner race 99 of ball bearing 96. At the left-hand end of input element 128, axial shifting relative to input shaft 78 is prevented by an annular shoulder 148, and shaft 78 in turn abuts shoulder 146 on motor ouput shaft 79 to prevent longitudinal shifting of the shaft. Axial shifting in the opposite direction is prevented by a cylindrical spacer 150, surrounding the sleeve, which extends between the right-hand end of input element 128 and the left-hand face of washer 144.

Surrounding clutch input element 128 is an annular coil support 152 having a J-shaped cross-section with the annular, ring-like electromagnetic coil 136 mounted between the legs 156 and 158 of the J in any suitable manner. Coil support 152 is rigidly maintained non-rotatable and in axially fixed relation to the walls of housing 88 by a suitable bracket 160, only a portion of which is shown.

An armature support 162, formed of a pair of cylindrical members 164 and 166 fastened together by a setscrew 168, surrounds coil 136 and is rotatively fixed to clutch input element 128 by a cap screw 170. A ball bearing 172, with its outer race 174 abutting element 164 of armature support 162 and the adjacent portions of clutch input element 128 and its inner race 176 surrounding, and abutting a shoulder 177 on, leg 158 of stationary coil support 152, journals the armature support for free rotational movement with clutch input element 128.

Slidably mounted on the outer surface of armature support element 164 is the ring-like armature 134 which may be moved to the left by electromagnetic coil 136 when the latter is energized. Armature 134 is connected by cap screws 180 (only one of which is shown) to an annular clutch pressure plate 182 non-rotatably supported by splines 184 on rim 186 of a backing plate 188 rotatively fixed to clutch input element 128 by setscrews 190 (only one of which is shown) and slidable thereon under the influence of the armature.

Slidably mounted on end bell 98 are the clutch plates 130, referred to above, which are however, rotatively fixed to the end bell by a splined connection 192. The specific nature of this connection is not part of the present invention and the connection may therefore be of any suitable type.

Clutch plates 132, which are interleaved between clutch plates 130, are rotatively fixed by splined connection 184 to horizontal rim 186. Splined connection 184 may be of any suitable type which will rotatively fix backing plate 188 and clutch plates 132 while permitting sliding of the latter with respect to the former.

When electromagnetic coil 136 is energized, it will slide armature 134 to the left on armature support element 164 together with pressure plate 182 and clutch plates 130 and 132. As the reaction force between pressure plate 182 and backing plate 188 is applied by armature 134, plates 130 and 132 will also be forced against each other with consequent development of frictional forces between adjacent plates. Sufficient friction will exist between clutch plates 130 and 132 that they will, in effect, rotate as a unitary body, driving two-speed drive assembly output shaft 82 at the same speed as input shaft 78.

When coil 136 is deenergized, armature 134 will cease to exert sufficient force on pressure plate 182 to maintain clutch plates 130 and 132 in frictional driving engagement. Consequently, clutch plates 130 will slip on the adjacent clutch plates 132 and output shaft 82 will cease to rotate.

The foregoing power transmitting train—from motor shaft 79 through two-speed drive assembly input shaft 78, clutch input element 128, backing plate 182, clutch plates 132, clutch plates 130, clutch output element 98, to two-speed drive assembly output shaft 82 constitutes the high-speed drive of the drive assembly. Since input shaft 78 is connected directly to output shaft 82 through electromagnetic clutch 84, there is a minimum loss of transmission efficiency.

As was pointed out above, while this high-speed operation is desirable for moving the valve disc through the major portion of its valve-opening movement, it is also desirable that the terminal portion of this movement be accomplished at a lower speed to eliminate the effects of water hammer. In the present invention, low-speed operation is accomplished by operatively interposing the gear reduction drive train 80 between the input shaft 78 and the output shaft 82. Referring still to FIGURE 4, a pinion 194 integrally formed on the left-hand end of input shaft 78 comprises the input of gear train 80. Pinion 194 meshes with a relatively large diameter spur gear 196 rotatively fixed by a key 198 to a horizontally extending gear shaft 200. The reduced diameter, left-hand end portion 202 of shaft 200 is rotatively mounted in a ball bearing 204. The outer race 206 of ball bearing 204 is mounted adjacent the inner surface of an annular embossment 208 formed on the end wall 92 of motor adapter 88A and the inner race 210 of the ball bearing surrounds the reduced diameter end portion 202 of shaft 200. Adjacent its right-hand end, a reduced diameter portion 212 of shaft 200 is supported by a ball bearing 214, the inner race 216 of which surrounds and supports the shaft and abuts a shoulder 217 formed thereon. The outer race 218 of ball bearing 214 is supported by the bracket 106, described above. Rotatively fixed to the extreme right-hand end of shaft 200 by a key 220 and a retaining ring 222 is the output gear 224 of the power train 80 which is a relatively small diameter pinion. Output pinion 224 meshes with a relatively large diameter spur gear 226 rotatively mounted on output shaft 82 by ball bearings 228 and 230. The outer races 232 and 234 of ball bearings 228 and 230 engage the inner surface of the cylindrical hub portion 236 of spur gear 226. Inner races 238 and 240 surround and are supported on output shaft 82. Ball bearings 228 and 230 are prevented from shifting to the left by a thrust washer 242 interposed between ball bearing 228 and ball bearing 104. A retaining ring 244 locates gear 226 between outer races 232 and 234 of ball bearings 228 and 230.

Spur gear 226 is the input element of the electromagnetic clutch 86 which is, with the exceptions noted below, identical to the electromagnetic clutch 84 described in detail above. Like reference characters primed have, therefore, been employed to described like elements in the two clutches. The output element 128' of clutch 86 is identical to the input element 128 of clutch 84 and is rotatively and axially fixed in any suitable manner to output shaft 82 by a key 140'. To maintain clutch output element 128' in the proper axial position relative to output shaft 82, a pair of cylindrical spacers 246 and 248 are disposed over shaft 82. Spacer 246 extends between the inner race 240 of ball bearing 228 and the left-hand edge surface of clutch output element 128'. Spacer 248 extends between the right-hand edge surface of clutch output element 128' and the inner race 120 of ball bearing 112.

In clutch 86, the first series of clutch plates 130' are rotatively fixed to the hollow hub portion 236 of spur gear 226 by a spline connection 192', which, as mentioned above, may be of any suitable type and the details of which are not critical in the present invention. With the above-noted exceptions, electromagnetic clutch 86 is identical to its counterpart, electromagnetic clutch 84.

The operation of electromagnetic clutches 84 and 86 are substantially identical. Thus, when the electromagnetic coil 136' of electromagnetic clutch 86 is energized, adjacent clutch plates 130' and 132' will be frictionally engaged, drive-connecting the input element 226 of electromagnetic clutch 86 to its output element 128'. This establishes a power transmission train from output shaft 79 of valve-operating electric motor 26 to input shaft 78 of two-speed drive assembly 28, then through input pinion 194 of gear reduction drive 80, spur gear 196, shaft 200, output pinion 224, input element 226 of electromagnetic clutch 86, clutch plates 130', clutch plates 132', and electromagnetic clutch output element 128' to output shaft 82. It will be noted that shaft 200 of gear reduction drive 80 rotates at a much lower speed than the input shaft 78 of two-speed drive assembly 28 because the pinion 194 driven by shaft 78 has a much smaller pitch diameter than the driven gear 196 rotatively fixed to the gear reduction drive shaft 200. A further speed reduction is obtained by driving relatively large pitch diameter input element 226 of electromagnetic clutch 86 by the relatively small pitch diameter pinion 224 fixed to gear reduction drive shaft 200. The power transmission train described above thus provides low speed operation for the terminal portions of the opening and closing movements of flow-controlling valve disc 32.

FIGURE 5 illustrates a typical circuit for controlling valve-operating motor 26 and two-speed drive 28 although it is to be understood that other circuits might equally well be employed. Motor 26, which may be of the conventional reversing type, is connected by leads 250 and 252 to a suitable power source 256. A conventional reversing controller 258 connected in leads 250 and 252 controls the current flow to the motor. This controller may, depending upon the particular application of valve assembly 20, be manually or automatically controlled. In either event, controller 258 may be used to operate the motor in either direction to move valve disc 32 from the closed to the open position or from the open to the closed position. Conventional position and torque limit switches, indicated generally by reference character 262, may be used to stop the motor through reversing controller 258 if desired.

Power source 256 is connected to coil 136 of high-speed electromagnetic clutch 84 through lead 264 and switch contacts 266, and to coil 136' of low-speed electromagnetic clutch 86 through lead 268 and switch contacts 270. Parallel-connected leads 272 and 274 complete the circuits from the two coils 136 and 136' to power source 256. For D.C. motors direct connection as shown can be made. For A.C. motors a suitable rectifier (not shown)

can be incorporated in the leads to supply direct current to the clutch coils.

Thus, staring with the valve open, when the main controller 258 is closed to energize motor 26 in the closing direction, coil 136 of electromagnetic clutch 84 will be energized since intermediate limit switch actuator 278 holds contactor 267 against contacts 266 and two-speed drive input shaft 78 will be coupled directly to output shaft 28, moving valve disc 32 at high speed. When disc 32 has moved through the substantial portion of its closing movement (typically on the order of 90%), preset limit switch actuator 278 will be activated to move switch contactor 267 away from contacts 266 and into engagement with contacts 270, deenergizing coil 136 of clutch 84 and energizing coil 136' of clutch 86. Input shaft 78 is thus connected to output shaft 82 to rotate more slowly and thereby move disc 32 at a slower rate through the remainder of its closing movement.

Switch contactor 267 may be a snap action switch or a relay energized by a direct operating limit switch closed by descending movement of the valve stem although it may be activated manually or in any other manner suited to the particular application of the valve. Contactor 267 will, usually, operate in reverse during the opening movement of the valve since, normally, much higher pressures resist valve-opening movement during this initial portion of the valve travel. Then, after disc 32 has moved through 10% or so of its opening movement, contactor 267 will move out of engagement with contacts 270 and into engagement with contacts 266, deenergizing clutch 86 and energizing clutch 84 to re-establish high-speed drive. The portions of closing and opening travel at the high or low speed rate may be varied to suit the application by suitable limit switch arrangements.

Leads 264, 268, 272, and 274 are brought into drive assembly housing 88 through a receptacle 280 formed on and extending downwardly from drive assembly housing bottom wall 108, entering the receptacle through an aperture 281. Receptacle 280 may also house many of the circuit elements described above, especially those directly associated with the two-speed drive assembly. From the receptacle, the foregoing leads pass through apertures 282 into the interior of the housing where they are connected to coils 136 and 136'. Other leads may pass from the receptacle through aperture 283 to motor 26 to supply motor-operating and controlling current to the motor. Connectors 284 are threaded into apertures 282 around the leads to prevent the metal around the periphery of the apertures from damaging the insulation on the leads and to seal in the gear lubricant. Access to the leads and other circuit elements is gained by removing receptacle cover 286 which is secured to the receptacle by suitable releasable fasteners (not shown). A gasket 288 is disposed between the receptacle and cover to prevent moisture from penetrating to its interior.

The "non-fail-safe" electromagnetic clutches described above are the least expensive and are acceptable in many installations. However, in other installations, it may be desirable, or even necessary, that the two-speed drive assembly "fail-safe" so that, if the operating current to the electromagnetic clutches is interrupted, motor 26 may still be employed to actuate the valve operator 24 to open and close the valve. A "fail-safe" two-speed drive assembly 290, constructed in accordance with the principles of the present invention, is schematically shown in FIGURE 6. Drive assembly 290 is identical to drive assembly 28, described above, except that clutch 86 has been replaced with the electromagnetic clutch 292 schematically illustrated in FIGURE 7.

Clutch 292 may be of any suitable construction and, as illustrated (see FIGURE 7), has an input element 294 meshed with output pinion 224 of gear reduction drive 80 and rotatably journalled on output shaft 82 and an output element 296 rotatively and axially fixed to output shaft 82 by a key 298. A first series of clutch plates 300, rotatively fixed to clutch input element 294, and a second series of clutch plates 302, rotatively fixed to clutch output element 296, are biased into frictional driving engagement by clutch springs 304, extending between a transverse wall 306 of clutch output element 296, and a pressure plate 308 rotatably fixed to the clutch output element.

Coil 310 (which may be supplied with current by use of a commutator, or a non-rotating coil design such as employed in clutch 86, or in any other appropriate manner) has an armature 312 connected by studs 314 to pressure plate 308. When the coil is energized, armature 312, studs 314 and pressure plate 308 will move to the right against the bias of springs 304, reducing the frictional forces between clutch plates 300 and 302 with a consequent cessation of driving force to output shaft 82.

It will be apparent, from the foregoing description, that if the operating current to coil 310 is interrupted, springs 304, acting through pressure plate 308, will again restore frictional driving engagement between clutch plates 300 and 302 so that motor 26 can drive output shaft 82 at low speed, regardless of the interruption of coil-operating current to clutches 84 and 292.

FIGURE 8 illustrates an alternatively employable electromagnetic clutch 316 which may replace either or both of the clutches 84 and 86 and which is identical to them except for the mounting of coil 136 and the manner in which operating current is supplied to it. In this alternative embodiment, coil 136 is rotatively fixed to clutch input element 128 (or output element 128 if the clutch is arranged in a manner similar to clutch 86). Attached to the right-hand side of the annular coil 136 in any suitable manner are a pair of concentric ring-like contacts 318 and 320 to which are connected the terminals (not shown) of the coil.

As coil 136 rotates, contacts 318 and 320 engage and slide on a pair of brushes 322 and 324 biased into engagement with contacts 318 and 320 by mounting bracket 326 (only a portion of which is shown) which may be attached in any suitable manner to assembly housing 88. Brushes 322 and 324 may be insulated by a ring of insulation 327 and are connected to a source of coil-operating current by suitable leads such as those shown at 264 and 272, or at 268 and 274, in FIGURES 5 and 6 above. It is to be understood that the above arrangement is exemplary and that any suitable arrangement for supplying current to a rotating coil may equally well be employed.

It will further be understood that it is not necessary, in electromagnetic clutch 86, to connect clutch plates 130 to clutch input element 226 in the manner shown. To provide a further clutch embodiment useful in certain applications, a slotted cup may be assembled to the input element 226 to engage the outer periphery of the clutch plates. Numerous other modifications of which those described above are exemplary, may be made to the illustrated exemplary structure to better suit it to particular applications without going beyond the scope of the present invention.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. Two-speed drive apparatus for a valve having a valving member, a valve operator for moving said valving member between open and closed positions and power means for actuating said valve operator, comprising:
   (a) first and second rotatively mounted, axially aligned shafts;
      (1) said second shaft being rotatably supported adjacent each end thereof by bearing means;

(b) a first electromagnetic clutch with its input element rotatively fixed to said first shaft and its output element rotatively fixed to said second shaft;
  (1) said output element of said first clutch having a cup shaped end bell portion,
  (2) bearing means disposed within said end bell portion for rotatably supporting one end of said first shaft;
(c) a second electromagnetic clutch mounted on said second shaft between said bearing means with its input element rotatable about said second shaft and its output element rotatively fixed thereto;
(d) means adapted to be connected to said power means for affecting simultaneously rotation of said first shaft and the input element of said second electromagnetic clutch upon activation of said power means;
(e) seelctively operable means for energizing one or the other of said electromagnetic clutches to drive connect its input and output elements and thereby effect rotation of said second shaft through the selectively energized clutch; and
(f) means for connecting said second shaft to said valve operator.

2. A valve assembly having, in combination:
(a) a valving member;
(b) valve operating means for moving said valving member between open and closed positions;
(c) power means; and
(d) two-speed drive apparatus interposed between and operatively connected to said power means and said valve operating means, comprising:
  (1) a housing;
  (2) first and second co-axial shafts rotatively mounted in said housing;
    (a) said second shaft being rotatably supported adjacent each end thereof by bearing means,
  (3) first clutch means having an input element rotatively fixed to said first shaft and an output element rotatively fixed to said second shaft;
    (a) said output element of said first clutch having a cup shaped end bell portion,
    (b) bearing means disposed within said end bell portion for rotatably supporting one end of said first shaft;
  (4) second clutch means mounted on said second shaft between said bearings with an input element free to rotate thereabout and an output element rotatively fixed thereto;
  (5) means operatively connected to said power means for simultaneously rotating said first shaft and the input element of said second clutch means at a high speed and a low speed respectively;
  (6) means for selectively engaging one or the other of said clutch means, thereby drive connecting its input and output elements and effecting selected high speed or low speed rotation of said second shaft through the energized clutch; and
  (7) means connecting said second shaft to said valve operating means.

References Cited by the Examiner
UNITED STATES PATENTS

| | | | |
|---|---|---|---|
| 1,132,478 | 3/15 | Johnson. | |
| 2,306,644 | 12/42 | Sewell | 74—365 |
| 2,868,340 | 1/59 | Wilson et al. | 74—365 X |
| 2,893,256 | 7/59 | Wargo | 74—370 |
| 2,912,087 | 11/59 | Kron | 251—134 X |
| 2,919,594 | 1/60 | Patrignani | 74—365 |
| 2,936,054 | 5/60 | Simon et al. | |
| 3,066,781 | 12/62 | Straub. | |

FOREIGN PATENTS 6,469  8/05  Great Britain.

DON A. WAITE, *Primary Examiner.*
BROUGHTON G. DURHAM, *Examiner.*